United States Patent [19]

Seiler et al.

[11] Patent Number: 4,672,086

[45] Date of Patent: Jun. 9, 1987

[54] SELF-EXTINGUISHING THERMOPLASTIC POLYESTER MOLDING MATERIALS

[75] Inventors: Erhard Seiler, Ludwigshafen; Juergen Hambrecht, Heidelberg; Gerhard Heinz, Weisenheim, all of Fed. Rep. of Germany

[73] Assignee: Basf Aktiengesellschaft, Ludwigshafen, Fed. Rep. of Germany

[21] Appl. No.: 803,585

[22] Filed: Dec. 2, 1985

[30] Foreign Application Priority Data

Dec. 14, 1984 [DE] Fed. Rep. of Germany ....... 3445570

[51] Int. Cl.$^4$ .......................... C08K 5/53; C08K 5/52
[52] U.S. Cl. ..................... 524/127; 524/139; 524/141; 524/447; 524/456; 524/508; 524/513; 524/539
[58] Field of Search ............... 524/508, 539, 513, 447, 524/456, 139, 127; 525/397

[56] References Cited

U.S. PATENT DOCUMENTS

| | | | |
|---|---|---|---|
| 3,113,986 | 12/1963 | Breslow | 585/266 |
| 3,219,625 | 11/1965 | Blanchard | 528/216 |
| 3,306,874 | 2/1967 | Hay et al. | 528/215 |
| 3,306,875 | 2/1967 | Hay et al. | 528/215 |
| 3,535,280 | 10/1970 | Schnell et al. | 526/64 |
| 3,673,281 | 6/1972 | Bronstert et al. | 525/339 |
| 3,956,442 | 5/1976 | Boulain | 264/562 |
| 3,962,174 | 6/1976 | Merardinelli | 524/539 |
| 3,965,069 | 6/1976 | Olander | 528/215 |
| 3,970,851 | 7/1976 | Jordan | 250/352 |
| 4,123,410 | 10/1978 | Lee | 524/539 |
| 4,242,473 | 12/1980 | Nametz et al. | 525/397 |
| 4,254,011 | 3/1981 | Bier | 524/513 |
| 4,257,937 | 3/1981 | Cohen et al. | 524/539 |
| 4,258,153 | 3/1981 | Yomamoto et al. | 525/397 |
| 4,369,282 | 1/1983 | Campbell | 524/513 |
| 4,417,026 | 11/1983 | Lindner et al. | 524/513 |
| 4,433,088 | 2/1984 | Haaf et al. | 525/397 |

FOREIGN PATENT DOCUMENTS

| | | |
|---|---|---|
| 0020605 | 1/1981 | European Pat. Off. . |
| 59-159847 | 9/1984 | Japan ................................ 525/397 |
| 59-179556 | 10/1984 | Japan ................................ 525/397 |
| 985614 | 3/1965 | United Kingdom . |
| 1020720 | 2/1966 | United Kingdom . |
| 1436812 | 5/1976 | United Kingdom . |

*Primary Examiner*—Lewis T. Jacobs
*Attorney, Agent, or Firm*—Keil & Weinkauf

[57] ABSTRACT

Self-extinguishing thermoplastic polyester molding materials containing linear aromatic polyesters, polyphenylene ethers and additives contain A. from 20 to 50% by weight of polyethylene terephthalate and/or polybutylene terephthalate, as much as 20 mol % of which may be modified with other dicarboxylic acids and/or diols, B. from 10 to 40% by weight of one or more polyphenylene ethers, C. from 5 to 15% by weight of one or more alkali metal or alkaline earth metal phosphates, high-boiling phosphoric acid esters, phosphorous acid esters, phosphinic acid esters or phosphonous acid esters or organic phosphine oxides, D. from 5 to 30% by weight of framework-forming fillers, E. from 0 to 30% by weight of one or more aromatic polycarbonates, F. from 0 to 30% by weight of glass fibers, G. from 0 to 20% by weight of one or more elastomeric polymers, H. from 0 to 20% by weight of one or more styrene polymers, the percentages of components A to H summing to 100, and I. if required, additives in effective amounts.

10 Claims, No Drawings

SELF-EXTINGUISHING THERMOPLASTIC POLYESTER MOLDING MATERIALS

Thermoplastic polyesters are widely used in the production of shaped articles by injection molding and extrusion. Such polyester molding materials have also been modified by the addition of elastomeric polymers and aromatic polycarbonates in order to improve the impact strength, as disclosed in German Laid-Open Application DOS No. 3,234,174. According to European Patent Application No. 20,605, polyester molding materials modified with polycarbonates and elastomeric polymers should be flameproofed with, for example, elemental phosphorus or tetrabromobisphenol A in order to reduce the flammability. However, the addition of elemental red phosphorus has the disadvantage that phosphine formation takes place, while the use of halogenating flameproofing agents results in the formation of toxic gases in the event of a fire. Since the industrial requirements which have to be met by the polyester molding materials used are constantly becoming more stringent, the conventional polyester molding materials no longer meet all the requirements set.

It is an object of the present invention to provide self-extinguishing thermoplastic polyester molding materials which not only possess greater heat distortion resistance and resistance to chemicals, are easier to process and have improved toughness, but also are distinguished in that the additives used are not toxic, are not exuded, do not cause any corrosion and produce only a small amount of toxic fumes in the event of a fire.

We have found that this object is achieved by self-extinguishing thermoplastic polyester molding materials containing linear aromatic polyesters, polyphenylene ethers and additives, which contain A. from 20 to 50% by weight of polyethylene terephthalate and/or polybutylene terephthalate, as much as 20 mol % of which may be modified with other dicarboxylic acids and/or diols, B. from 10 to 40% by weight of one or more polyphenylene ethers, C. from 5 to 15% by weight of one or more alkali metal or alkaline earth metal phosphates, high-boiling phosphoric acid esters, phosphorous acid esters, phosphinic acid esters or phosphonous acid esters or organic phosphine oxides, D. from 5 to 30% by weight of framework-forming fillers, E. from 0 to 30% by weight of one or more aromatic polycarbonates, F. from 0 to 30% by weight of glass fibers, G. from 0 to 20% by weight of one or more elastomeric polymers, H. from 0 to 20% by weight of one or more styrene polymers, the percentages of components A to H summing to 100, and I. if required, additives in effective amounts.

The novel molding materials have the advantages that no toxic additives are used, the shaped articles produced from the molding materials do not cause any corrosion, no efflorescence or exudation is detectable and, in the event of a fire, only a small amount of toxic and corrosive fumes is evolved. Moreover, the novel molding materials possess good mechanical properties.

The molding materials according to the invention contain, as component A, from 20 to 50, in particular from 20 to 35, % by weight of polyethylene terephthalate and/or polybutylene terephthalate, as much as 20 mol % of which may be modified with other dicarboxylic acids and/or diols. Examples of suitable modifiers are aliphatic dicarboxylic acids of not more than 12 carbon atoms, cycloaliphatic dicarboxylic acids containing 6 ring members, and aromatic dicarboxylic acids derived from benzene or naphthalene. Examples of these are adipic acid, sebacic acid, cyclohexanedicarboxylic acid, isophthalic acid, naphthalene-2,7-dicarboxylic acid and naphthalene-2,6-dicarboxylic acid. Diols which are particularly suitable as modifiers are aliphatic and cycloaliphatic diols of not more than 10 carbon atoms, such as ethylene glycol, propylene glycol, hexamethylene glycol, neopentylglycol and 1,4-bishydroxymethylcyclohexane.

The linear thermoplastic polyesters used advantageously have a relative viscosity of from 1.35 to 1.8, polyethylene terephthalate and polybutylene terephthalate having become particularly important industrially.

The novel molding materials contain, as component B, from 10 to 40, in particular from 20 to 35, % by weight of one or more thermoplastic polyphenylene ethers. The polyphenylene ethers used according to the invention are compounds based on polyphenylene oxides disubstituted ortho to the ether oxygen, the ether oxygen of one unit being bonded to the benzene nucleus of the adjacent unit. Advantageously, not less than 50, in particular from 55 to 100, units, are linked together. Polyphenylene ethers can be substituted in the o-position with respect to the oxygen by halogen, such as chlorine or bromine, alkyl of not more than 4 carbon atoms which does not possess a tertiary α hydrogen atom, haloalkyl of not more than 4 carbon atoms, such as chloromethyl or 2-chloroethyl, phenyl which is unsubstituted or substituted by alkyl of not more than 4 carbon atoms or by halogen, or alkoxy of not more than 6 carbon atoms. Examples of suitable polyphenyl ethers are poly-(2,6-dichloro-1,4-phenylene) poly-(2,6-diphenyl-1,4-phenylene) ether, poly-(2,6-dimethoxy-1,4-phenylene) ether, poly-(2,6-dimethyl-1,4-phenylene) ether and poly-(2,6-dibromo-1,4-phenylene) ether. Suitable polyphenylene ethers advantageously have an intrinsic viscosity of from 0.4 to 0.7 dl/g (measured on a 0.5% strength by weight solution in chloroform at 30° C.). Poly-(2,6-dimethyl-1,4-phenylene) ether has become particularly important industrially.

The polyphenylene ethers used according to the invention are known per se and can be prepared by autocondensation of the corresponding monohydric phenols in the presence of molecular oxygen and of a catalyst. Suitable processes are described in, for example, U.S. Pat. Nos. 3,219,625, 3,306,874, 3,306,875, 3,956,442, 3,965,069 and 3,970,851.

The novel molding materials contain, as component C, from 5 to 15, in particular from 5 to 12, % by weight of one or more alkali metal or alkaline earth metal phosphates, high-boiling phosphoric acid esters, phosphorous acid esters, phosphinic acid esters or phosphonous acid esters or organic phosphine oxides. Examples of suitable phosphates are sodium phosphate, calcium phosphate and in particular polyphosphates, such as sodium tripolyphosphate. Preferred high-boiling phosphoric acid esters, phosphorous acid esters, phosphinic acid esters, phosphonous acid esters and organic phosphine oxides have a boiling point above 180° C. Triaryl phosphates, triaryl phosphites, triarylphosphine oxides, diaryl mono- and diphosphonites, diaryl phosphinates and phosphates and/or phosphites which are substituted by both alkyl and aryl are preferred. Phosphates of alkanols of 5 to 20 carbon atoms, such as octanol, nonanol or decanol, phenols of 6 to 20 carbon atoms, such as pheno or cresols, and aralkanols of 7 to 20 carbon atoms, such as benzyl alcohol or phenylethyl alcohol, or mixtures of these, are advantageously used. Preferred phosphoric acid esters and phosphorous acid esters are triphenyl phosphate, tricresyl phosphate, trixylyl phosphate, trimesityl phosphate, diphenyl mesityl phosphate, dimesityl phenyl phosphate, diphenyl dodecyl phosphate, trisnonylphenyl phosphite, tris-(2,6-di-tert.-butylphenyl) phosphite and diphenyl decyl phosphite.

Preferred organic phosphine oxides advantageously contain, as ligands, 3 alkyl radicals of 5 to 20 carbon atoms, unsubstituted or alkyl-substituted phenyl radicals of 6 to 20 carbon atoms or aralkyl radicals of 7 to 20 carbon atoms. Triphenylphosphine oxide is particularly preferred.

Suitable phosphinic acid esters contain, as ligands, unsubstituted or alkyl-substituted phenyl of 6 to 20 carbon atoms, diphenyl phosphinate being particularly suitable. Useful phosphonous acid esters possess, for example, unsubstituted or alkyl-substituted phenyl of 6 to 20 carbon atoms as ligands. Tris-(2,4-di-tert.-butylphenyl) phosphinate and bis-(2,4-di-tert.-butylphenyl) biphenylene phosphonite are particularly useful.

The stated alkali metal and alkaline earth metal phosphates, high-boiling phosphoric acid esters, phosphorous acid esters, phosphonous acid esters and phosphinic acid esters and phosphine oxides can be used individually or in combination with one another.

The molding materials according to the invention contain, as component D, from 5 to 30, in particular from 10 to 25, % by weight of framework-forming fillers. Inorganic framework-forming fillers are preferably used in order to prevent dripping and to promote coking. Examples of suitable fillers of the stated type are talc, wollastonite, chalk, zinc sulfide, zinc oxide, gypsum fibers, e.g. Franklin fibers, synthetic calcium silicates, kaolin, calcined kaolin and magnesium hydroxide. Calcined kaolin, wollastonite, talc and zinc sulfide are preferred.

The novel thermoplastic molding materials may additionally contain

E. from 0 to 30, in particular from 10 to 20, % by weight of one or more aromatic polycarbonates, F. from 0 to 30, in particular from 5 to 25, % by weight of glass fibers, G. from 0 to 20, in particular from 5 to 10, % by weight of one or more elastomeric polymers and H. from 0 to 20, in particular from 2 to 10, % by weight of one or more styrene polymers.

The percentages of components A to H sum to 100.

Suitable aromatic polycarbonates (component E) according to the invention can be prepared by polycondensation at the phase boundary, for example by the process described in German Patent 1,300,266 or by transesterification of diphenyl carbonate with bisphenol A by the process described in German Laid-Open Application DOS No. 1,495,730. Bisphenol A may be replaced with as much as 30 mol % of other aromatic bishydroxy compounds, in particular 2,2-bis-(4-hydroxyphenyl)-pentane, 2,6-dihydroxy-naphthalene, bis-(4-hydroxyphenyl) sulfone, bis-(4-hydroxyphenyl) ether, bis-(4-hydroxyphenyl) sulfide, bis-(4-hydroxyphenyl)-methane, 1,1-bis-(4-hydroxyphenyl)-ethane or 4,4'-dihydroxydiphenyl.

Particularly suitable polycarbonates for the purpose according to the invention are those which have a relative viscosity (measured at 25° C. on a 0.5% strength by weight solution in methylene chloride) of from 1.2 to 1.5, preferably from 1.28 to 1.40. Polycarbonates derived from bisphenol A have become particularly important industrially.

The glass fibers present in the molding material generally have a mean length of from 0.1 to 0.5 mm, preferably from 0.15 to 0.30 mm and a diameter of up to 20 $\mu$m, preferably from 10 to 14 $\mu$m. Glass fibers of E glass are particularly preferred. In order to achieve better adhesion, the glass fibers are advantageously coated with an organosilane, such as an aminoalkylsilane, in particular an aminoalkyltrialkoxysilane, e.g. $\gamma$-aminopropyltriethoxysilane.

Examples of suitable elastomeric polymers (component G) are block copolymers of styrene and butadiene or hydrogenated styrene/butadiene block copolymers. Useful polymers are described in, for example, British Patent No. 985,614 (branched block copolymers), U.S. Pat. No. 3,113,986, Germah Published Application DAS No. 1,222,260, German Laid-Open Application DOS No. 2,013,263 (hydrogenated block copolymers) and German Patent No. 2,402,715 (three-block copolymers). Other useful elastomeric polymers are composed of, for example, ethylene, $C_2$–$C_8$-alkyl (meth)acrylates and (meth)acrylic acid. Preferred polymers contain from 5 to 85% by weight of ethylene, from 20 to 50% by weight of primary or secondary $C_2$–$C_8$-alkyl (meth)acrylate, preferably n-butyl acrylate, and from 0.5 to 10% by weight of a monomer possessing an acidic function or a latent acidic function, e.g. monomers containing acid groups, such as methacrylic acid or acrylic acid, or a monomer which possesses blocked acid groups and forms acid groups under the compounding conditions, e.g. tert.-butyl (meth)acrylate.

Graft rubbers are also suitable, rubber-like polymers of this type being known per se. They are prepared from a grafting base which is obtainable by emulsion polymerization of suitable monomers, such as butadiene, isoprene and $C_2$–$C_8$-alkyl esters of acrylic acid or methacrylic acid, in the presence or absence of as much as 30% by weight of monomers which give hard polymers when subjected to homopolymerization, e.g. styrene, acrylonitrile, methacrylic acid, methyl methacrylate and methyl acrylate. Advantageously, the grafting base is crosslinked and has a gel content of, in particular, more than 30% by weight. In order to effect sufficient crosslinking, from 1 to 10% by weight, based on the monomers, of crosslinking agents having more than 2 double bonds, for example bifunctional monomers, such as butanediol diacrylate, dicyclopentadienyl acrylate or butadiene, are advantageously present. Monomers are then grafted onto the grafting base, examples of these monomers being $C_2$–$C_8$-alkyl acrylates, in particular n-butyl acrylate, in particular monomers which give a hard grafted shell, such as styrene, acrylonitrile or methyl methacrylate, in particular mixtures of these. It has also proven useful if the grafted shell is formed using epoxide-containing monomers, such as glycidyl acrylate, in amounts of from 1 to 10% by weight, based on the total amount of monomers intended for the grafted shell.

Suitable styrene polymers (component H) are all known homopolymers and copolymers synthesized from alkenylaromatic monomers. Preferred polymers are derived from styrene which is unsubstituted or alkyl-substituted in the nucleus or in the side chain. Particularly preferred monomers from which the polymers are derived are styrene, p-methylstyrene, α-methylstyrene or mixtures of these, in particular styrene. Comonomers which may be used are polar monomers, such as acrylonitrile, acrylic acid, (meth)acrylates of alkanols of 1 to 8 carbon atoms and/or maleic acid, as well as N-alkyl-substituted or N-aryl-substituted maleimides. The amount of comonomers is such that the resulting copolymers can be mixed with the particular polyphenylene ether to give a homogeneous mixture; this can be determined readily by simple experiments. It is also possible to use non-polar comonomers, such as butadiene, isoprene or pentadiene, which, together with the above alkenylaromatic monomers, give random or block copolymers.

Examples of suitable styrene polymers are polystyrene, poly-p-methylstyrene, poly-α-methylstyrene, styrene/α-methylstyrene, styrene/acrylonitrile, styrene/methyl acrylate, styrene/butyl acrylate, styrene/methyl methacrylate, styrene/butadiene, stryene/maleic anhydride and styrene/acrylonitrile/butadiene copolymers, copolymers of ethylvinylbenzene and divinylbenzene, and styrene/ butadiene polymers modified with acrylic resins. Mixtures of homopolystyrene and the above copolymers are also useful.

Other suitable styrene polymers are styrene polymers toughened with elastomeric polymers. As a rule, such high impact styrene polymers contain from 2 to 20% by weight of an elastomeric polymer. Preferred elastomeric polymers have a glass transition temperature (Tg) of less than 0° C., in particular less than −20° C. Suitable elastomeric polymers are natural rubber, polybutadiene, polyisoprene, copolymers of butadiene and/or isoprene with styrene, a $C_2$–$C_8$-alkyl acrylate or acrylonitrile, polymers of $C_2$–$C_8$-alkyl acrylates, polyisobutylene and elastomeric copolymers composed of ethylene, propylene and dienes.

The novel molding materials may contain, as a further component I, effective amounts of any additives and/or assistants as conventionally used for thermoplastic polymers for molding materials. Examples of such additives and/or assistants are dyes, pigments, antistatic agents, antioxidants, lubricants and mold release agents.

The novel thermoplastic molding materials are advantageously prepared by mixing the polymers in the molten state, for example at from 260° to 330° C., together with the remaining components. Examples of suitable mixing apparatuses are extruders and kneaders.

The molding materials according to the invention are useful for the production of shaped articles by injection molding or extrusion.

The Examples which follow illustrate the invention.

EXAMPLES 1 to 5

A thermoplastic polyester (component A), a polyphenylene ether (component B), a flameproofing agent (component C) and framework-forming fillers (component D) are mixed in a twin-screw extruder at 280°–300° C., with or without the addition of aromatic polycarbonates (component E), glass fibers (component F), elastomeric polymers (component G) or styrene polymers (component H). The compositions of the individual thermoplastic polyester molding materials are shown in Table 1 below, while the resulting properties of the molding materials are given in Table 2.

TABLE 1

| % by weight | Examples | | | | |
|---|---|---|---|---|---|
| | 1 | 2 | 3 | 4 | 5 |
| Polybutylene terephthalate | 35 | — | 25 | 20 | 30 |
| Polyethylene terephthalate | — | 30 | — | 10 | — |
| Polycarbonate | — | 10 | 15 | 20 | 10 |
| PPE | 30 | 25 | 25 | 20 | 35 |
| Triphenyl phosphate | 5 | 5 | 5 | 5 | 8 |
| Trisnonylphenyl phosphite | 1 | — | — | — | 2 |
| Calcined kaolin sil. | — | 15 | — | 10 | — |
| Wollastonite sil. | 10 | — | 15 | — | 15 |
| Glass fibers | 10 | 10 | 10 | 10 | — |
| Cariflex TR 1102 SBS 3-block copolymer | 5 | — | — | — | — |
| n-butyl acrylate/SAN Graft rubber | — | 5 | — | 5 | — |
| Butadiene/SAN Graft rubber | — | — | 5 | — | — |
| HIPS containing 8% by weight of polybutadiene | 4 | — | — | — | — |
| | 100 | 100 | 100 | 100 | 100 |

TABLE 2

| | (physical properties) | | | | | | |
|---|---|---|---|---|---|---|---|
| | | | | Total burning time | | | |
| Example | Residue on ignition, % | MFI 250° C./2.16 kg | Vicat/B [°C.] | (5 bars) [Sec] ⅛"/1/16" | | R [N/mm$^2$] | $a_n$ [KJ/m$^2$] | $E_Z$ [N/mm$^2$] |
| 1 | 22.8 | 4.5 | 165 | 38 (V-0)/(V-1) | 101 | 55 | 22 | 5700 |
| 2 | 26.3 | 5.8 | 158 | 52 (V-0)/(V-1) | 131 | 59 | 17 | 5900 |
| 3 | 26.1 | 2.9 | 161 | — | | — | — | 6100 |
| 4 | 22.5 | 4.8 | 162 | — | | — | — | 5300 |
| 5 | 17.2 | 5.2 | 148 | 22 (V-0)/(V-0) | 58 | 38 | 12 | 4800 |

Method of measuring the total burning time: UL-94 (Underwriters Laboratories),
R: tensile strength (DIN 53,455)
MFI: melt flow index
$a_n$: impact strength (DIN 53,453)
$E_Z$: modulus of elasticity in the tensile test (DIN 53,455)

We claim:
1. A self-extinguishing thermoplastic molding material comprising
   A. from 20 to 50% by weight of polyethylene terephthalate and/or polybutylene terephthalate, as much as 20 mol % of which may be modified with other dicarboxylic acids and/or diols,
   B. from 10 to 40% by weight of polyphenylene ether polymers disubstituted ortho to the ether oxygen atom by alkyl of not more than four carbon atoms which does not possess a tertiary α-hydrogen atom, phenyl which is unsubstituted or substituted by alkyl of not more than four carbon atoms, or alkoxy of not more than 6 carbon atoms, C. from 5 to 15% by weight of a member selected from the group consisting of alkali metal phosphates, alkaline earth metal phosphate, high-boiling phosphoric acid esters, phosphorous acid esters, phosphinic acid esters, organic phosphine oxides and mixtures thereof, D. from 5 to 30% by weight of framework-forming fillers, E. from 0 to 30% by weight of one or more aromatic polycarbonates, F. from 0 to 30% by weight of glass fibers, G. from 0 to 20% by weight of one or more elastomeric polymers, H. from 0 to 20% by weight of one or more styrene polymers, the percentages of components A to H summing to 100.

2. A molding material as defined in claim 1, which contains poly-(2,6-dimethyl-1,4-phenylene) ether as component B.

3. A molding material as defined in claim 1, which contains, as component C, a member selected from the group consisting of sodium tripolyphosphate, a triaryl phosphate, a triaryl phoshite, a triarylphosphine oxide, a diaryl mono- or diphosphonite, a diaryl phosphinate a phosphate or phosphite which is substituted by both alkyl and aryl and mixtures thereof.

4. A molding material as defined in claim 1, which contains, as component D, calcined kaolin and/or wollastonite.

5. A thermoplastic molding material as defined in claim 1, which contains, as component E, an aromatic polycarbonate derived from bisphenol A.

6. A thermoplastic molding material as defined in claim 1, which contains, as component G, an n-butyl acrylate rubber grafted with styrene and acrylonitrile.

7. A molding material as defined in claim 1, which contains, as component G, a polybutadiene rubber grafted with styrene and acrylonitrile.

8. A molding material as defined in claim 1, which contains, as component G, a polybutadiene rubber grafted with methyl methacrylate.

9. A molding material as defined in claim 1, which contains, as component G, a polybutadiene rubber grafted with styrene and/or styrene/acrylonitrile and, in a second state, with methyl methacrylate.

10. A molding material as defined in claim 1, which contains, as component H, polystyrene having a content of from 2 to 20% by weight of an elastomeric polymer with a glass transition temperature of less than 0° C.

* * * * *